(12) United States Patent
Lyssy (10) Patent No.: US 11,668,846 B2
(45) Date of Patent: Jun. 6, 2023

(54) SEISMIC SENSOR ALIGNMENT PRESERVER

(71) Applicant: PGS Geophysical AS, Oslo (NO)

(72) Inventor: Matthew Eric Lyssy, Houston, TX (US)

(73) Assignee: PGS Geophysical AS, Oslo (NO)

( * ) Notice: Subject to any disclaimer, the term of this patent is extended or adjusted under 35 U.S.C. 154(b) by 299 days.

(21) Appl. No.: 16/998,454

(22) Filed: Aug. 20, 2020

(65) Prior Publication Data

US 2021/0055441 A1 Feb. 25, 2021

Related U.S. Application Data

(60) Provisional application No. 62/889,459, filed on Aug. 20, 2019.

(51) Int. Cl.
*G01V 1/38* (2006.01)
*G01V 1/20* (2006.01)

(52) U.S. Cl.
CPC ............ *G01V 1/201* (2013.01); *G01V 1/3843* (2013.01); *G01V 1/20* (2013.01); *G01V 1/3835* (2013.01)

(58) Field of Classification Search
CPC .............................. G01V 1/201; G01V 1/3843
See application file for complete search history.

(56) References Cited

U.S. PATENT DOCUMENTS

| 4,641,288 A * | 2/1987 | McGowan ............. G01V 1/201 174/101.5 |
| 7,693,005 B2 * | 4/2010 | Stenzel ................... G01V 1/201 367/20 |
| 8,183,868 B2 | 5/2012 | Summerfield et al. |
| 8,228,761 B2 | 7/2012 | Ray et al. |
| 8,670,291 B2 | 3/2014 | Landry |
| 8,743,655 B2 | 6/2014 | Hillesund et al. |
| 8,897,938 B2 | 11/2014 | Fjellstad et al. |
| 9,874,647 B2 | 1/2018 | Südow et al. |
| 10,031,249 B2 | 7/2018 | Hillesund et al. |
| 2019/0004196 A1 * | 1/2019 | Contant ................. G01V 1/201 |
| 2020/0073002 A1 * | 3/2020 | Fernihough .......... G10K 11/006 |

FOREIGN PATENT DOCUMENTS

GB 2301328 12/1998

OTHER PUBLICATIONS

Grindheim et al., Modeliering, prediksjon og styring av slepte seismiske kabler, Kart Og Plan, vol. 77, pp. 1-16, POB 5003, No. 1432 AS, ISSN 0047-3278, 2017.
Researchgate, Study of Braid Topology and effect of Braid Pattern on Composite Properties, Jul. 2013.

* cited by examiner

*Primary Examiner* — Ian J Lobo (57) ABSTRACT

Disclosed are apparatuses, systems, and methods for urging matching rotational orientations of geophysical sensors in a marine geophysical streamer. An embodiment discloses a marine geophysical streamer comprising a jacket; spacers disposed longitudinally within the jacket, the spacers containing geophysical sensors; and an alignment preserver disposed within the jacket, the alignment preserver encompassing at least a portion of each of the spacers and configured to urge matching rotational orientations for the geophysical sensors.

22 Claims, 5 Drawing Sheets

SEISMIC SENSOR ALIGNMENT PRESERVER

CROSS-REFERENCE TO RELATED APPLICATIONS

The present application claims priority to U.S. Provisional Application No. 62/889,459, filed Aug. 20, 2019, the entire disclosure of which is incorporated herein by reference.

BACKGROUND

Embodiments relate generally to the field of marine geophysical surveying and, more particularly, embodiments relate to apparatuses, systems, and/or methods to align sensors of marine geophysical streamers.

Techniques for geophysical surveying include marine geophysical surveying, such as seismic surveying and electromagnetic surveying, in which geophysical data may be collected from below the Earth's surface. Geophysical surveying has applications in mineral and energy exploration and production to help identify and monitor locations of hydrocarbon-bearing formations. Certain types of marine geophysical surveying, such as seismic or electromagnetic surveying, may include towing an energy source at a selected depth—typically above the seafloor—in a body of water. One or more geophysical streamers may also be towed in the water at selected depths—typically above the seafloor—by the same or a different vessel. The streamers are typically cables that may include groups of sensors disposed thereon at spaced apart locations along the length of the cable. Some geophysical surveys locate sensors on ocean bottom cables or nodes in addition to, or instead of, streamers. The sensors may be configured to generate a signal that is related to a parameter being measured by the sensor. At selected times, the energy source may be actuated to generate, for example, seismic or electromagnetic energy that travels downwardly into the subsurface rock. Energy that interacts with interfaces, generally at the boundaries between layers of rock formations, may be returned toward the surface and detected by the sensors on the streamers. The detected energy may be used to infer certain properties of the subsurface rock, such as structure, mineral composition and fluid content, thereby providing information useful in the recovery of hydrocarbons.

Sensors within each group of sensors may be sensitive to misalignments (e.g., twist) with neighboring sensors within the group. For correct performance, a rotational orientation of each sensor may need to match rotational orientations of neighboring sensors within the group. Techniques to urge matching rotational orientations of the sensors within the group may need to comply with weight restrictions and should not hinder wire routing or interfere with other internal assemblies of the marine geophysical streamers. Accordingly, there is a need for apparatuses, systems, and/or methods to align sensors of marine geophysical streamers.

BRIEF DESCRIPTION OF THE DRAWINGS

These drawings illustrate certain aspects of some of the embodiments of the present disclosure and should not be used to limit or define the disclosure.

DETAILED DESCRIPTION

It is to be understood the present disclosure is not limited to particular devices or methods, which may, of course, vary. It is also to be understood that the terminology used herein is for the purpose of describing particular embodiments only and is not intended to be limiting. Although individual embodiments are discussed, the disclosure covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Embodiments relate to apparatuses, systems, and/or methods for aligning geophysical sensors within a group of a marine geophysical streamer ("streamer") to ensure or urge matching rotational orientations among all of the geophysical sensors within the group. Streamer twist or rotation, during towing, may cause misalignment between the geophysical sensors of a group. Specifically, the streamer twist may cause each geophysical sensor within the group to have a different rotational orientation from neighboring geophysical sensors within the group. The varying rotational orientations of the geophysical sensors may cause information (e.g., locations of subterranean formations) acquired with the geophysical sensors to be inaccurate. Thus, it may be advantageous to urge alignment of the geophysical sensors of groups in the streamer.

In particular embodiments, section spacers ("spacers") may contain the geophysical sensors. The spacers may be disposed within a skin or jacket of the streamer. The spacers may be attached to other spacers within a group via an alignment preserver.

The alignment preserver may be members that extend between adjacent spacers for urging alignment therebetween. In certain embodiments, the alignment preserver may include flexible high tensile strength strands ("strands"). For example, the strands may include polymers, aramids, ultra-high-molecular-weight polyethylene, liquid-crystal polymers, and/or poly-paraphenylene terephthalamide. The strands may withstand towing forces that may include tensions ranging from 2,000 Newtons to 30,000 Newtons or more. Use of the aforementioned materials prevents stretching while providing a relatively high degree of strength, which urges the spacers to stay slaved together to urge the same rotational orientation among all of the geophysical sensors within the group. Use of the aforementioned materials also reduces the amount of materials for construction of the alignment preserver.

The strands may extend longitudinally within each streamer and wrap around the spacers from one end of the group to the other, in a pattern such as, for example, a spiral pattern. In addition to a spiral pattern, the strands may be coiled or otherwise wound around the spacers from one end of the group to the other. Tension in the strands may urge alignment of the geophysical sensors within the group. Placement of the strands does not interfere with any wiring or other internal structures positioned within the jacket of the streamer. In particular embodiments, a first set of evenly spaced strands may be configured in a clockwise rotation and a second set of evenly spaced strands may be configured in a counterclockwise rotation to form a network of strands that encompasses (e.g., wraps) and secures the spacers.

In other embodiments, the alignment preserver may include a single piece of a flexible material such as a spiral wrap comprising carbon fiber, rubber, and/or plastic. The spiral wrap may be wrapped around and attached to the spacers in a spiral direction. Tension in the spiral wrap may urge alignment of the geophysical sensors in the group.

Additionally, in certain embodiments, the alignment preserver may include a tubular liner or sleeve made of a fabric. The fabric may include carbon fiber, polymers, aramids, ultra-high-molecular-weight polyethylene, liquid-crystal polymers, and/or poly-paraphenylene terephthalamide. The liner may resemble a sock and may slip over or encompass the spacers. Additionally, the liner may be attached to the spacers. Tension in the liner may urge alignment of the geophysical sensors in the group.

In particular embodiments, the alignment preserver may be attached to the spacers via one or more of various techniques including, for example, adhesives, welding and/or mechanical fasteners, such as clamps and/or bands. The mechanical fasteners may be disposed between the jacket and the alignment preserver in some embodiments.

In some embodiments, the streamers may include regions or section breaks between groups that do not include an alignment preserver. These section breaks allow twisting of the streamer within the section break, if needed, rather than breakage of the alignment preserver due to over twisting (i.e., twisting of the spacer beyond an upper limit of tension that the alignment preserver can withstand).

Figure 1:
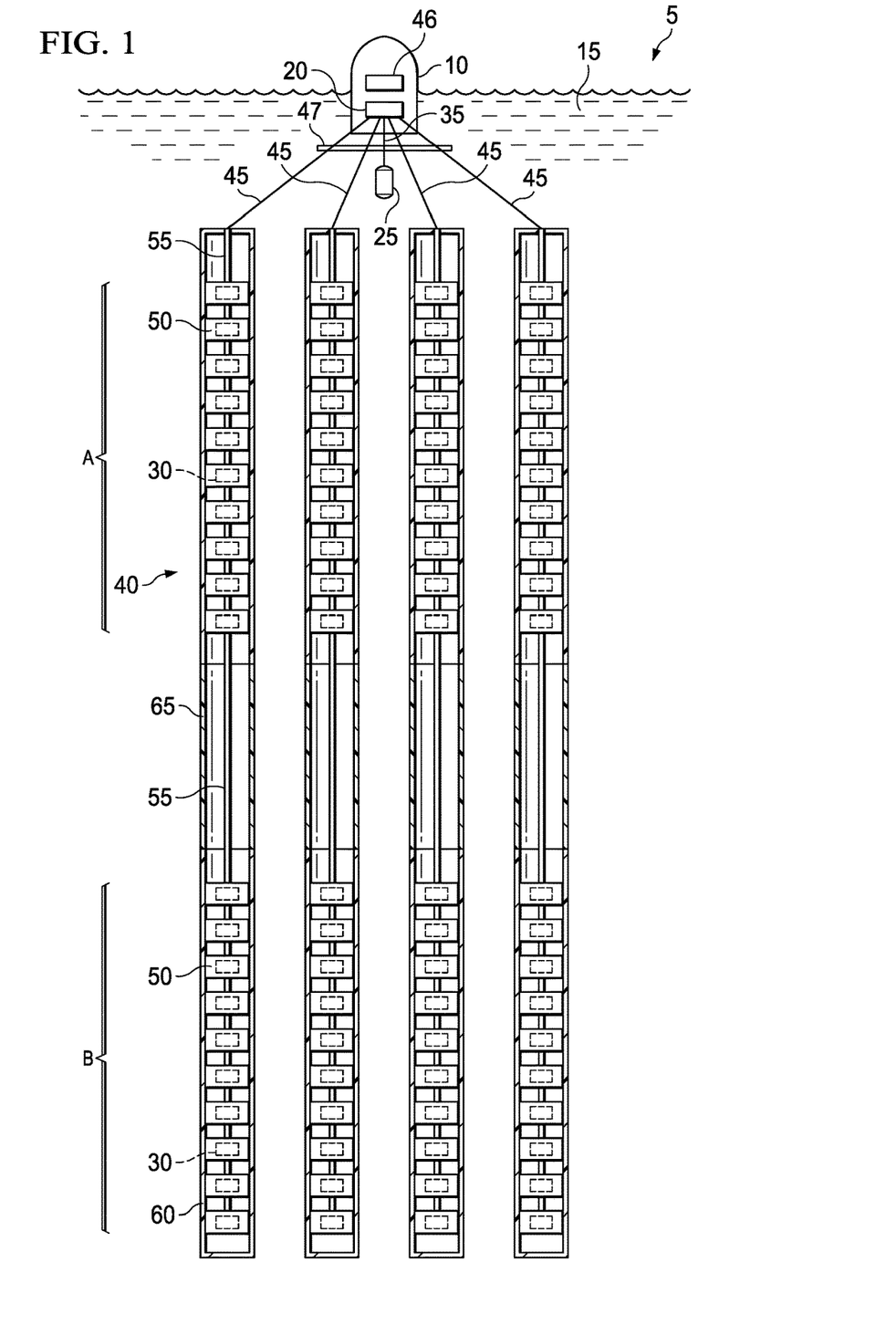
FIG. 1 illustrates an exemplary marine geophysical survey system with marine geophysical streamers.

FIG. 1 illustrates a top view of a marine geophysical survey system 5 in accordance with embodiments of the present disclosure. In the illustrated embodiment, the marine geophysical survey system 5 may include a survey vessel 10 that moves along the surface of a body of water 15, such as a lake or ocean. The survey vessel 10 may include thereon equipment (e.g., a computer system), shown generally at 20 and referred to for convenience as a "recording system." The recording system 20 typically includes devices (none shown separately) for navigating the survey vessel 10, such as global positioning system ("GPS") receivers, actuating one or more energy sources 25, and recording signals generated by geophysical sensors 30.

As illustrated, the survey vessel 10 or a different vessel (not shown) can tow a source cable 35 that includes one or more energy sources 25. The one or more energy sources 25 may be towed above the water bottom. The one or more energy sources 25 may be any selectively actuable sources suitable for marine geophysical surveying, including without limitation seismic air guns, water guns, vibrators, electromagnetic field transmitters, or arrays of such devices. In some embodiments, seismic energy and/or electromagnetic energy may originate from the one or more energy sources 25. As the energy is emitted by the energy sources 25, it travels downwardly through the body of water 15 and rock formations (not shown) below the water bottom. It should be noted that, while the present example shows only a single energy source 25, the disclosure is applicable to any number of energy sources towed by survey vessel 10 or any other vessel.

The geophysical survey system 5 may include a plurality of marine geophysical streamers 40 ("streamers 40") towed by the survey vessel 10 (or another vessel) with each of the streamers 40 including the geophysical sensors 30 at spaced apart locations. The streamers 40 may be towed above the water bottom. The streamers 40 may be spaced apart laterally, vertically, or both laterally and vertically. "Lateral" or "laterally," in the present context, means transverse to the direction of the motion of the survey vessel 10. The streamers 40 may each be formed, for example, by coupling a plurality of streamer sections end-to-end as explained in U.S. Pat. No. 7,142,481, the disclosure of which is incorporated herein by reference. The streamers 40 may be coupled at their forward end (with respect to direction of movement of the survey vessel 10) to corresponding lead-in lines 45. While not shown, each of the lead-in lines 45 may be deployed from the survey vessel 10 by a winch or other similar spooling device, for example, that can be used to control the deployed length of the lead-in lines 45. It should be noted that while the present example shows only four streamers 40, any number of streamers 40 may be towed by the survey vessel 10 or any other vessel. For example, in some embodiments, eight or more streamers 40 may be towed by survey vessel 10, while in other embodiments, as many as twenty-six or more streamers 40 may be towed by survey vessel 10. In certain embodiments, the streamers 40 may have a length ranging from 2,000 meters to 12,000 meters or longer. Other embodiments may include a streamer length that is less than 2,000 meters.

The geophysical sensors 30 may be any type of geophysical sensor known in the art. Non-limiting examples of such sensors may include seismic sensors such as geophones, hydrophones, piezoelectric sensors, accelerometers, or electromagnetic field sensors, such as electrodes or magnetometers, or combinations thereof. By way of example, the geophysical sensors 30 may generate response signals, such as electrical or optical signals, in response to detecting energy emitted from the one or more energy sources 25 after the energy has interacted with the rock formations (not shown) below the water bottom. Signals generated by the geophysical sensors 30 may be communicated to the recording system 20. In some embodiments, the geophysical survey system 5 may further include a power system 46 (e.g., a generator and/or a battery) that is configured to provide power to various components of or attached to the survey vessel 10 (e.g., the recording system 20, the one or more energy sources 25, and the geophysical sensors 30).

In certain embodiments, the geophysical sensors 30 may be positioned within sealed containers such as spacers 50 that may be disposed within and along at least a portion or segment of each of the streamers 40. The geophysical sensors 30 may be fixed to the spacers 50 and may not move within the spacers 50. The geophysical sensors 30 may be separated and arranged into groups such as a first group and a second group (e.g., groups A and B). Each group A or B may have a length ranging from 10 feet (3 meters) to 26 feet (8 meters). In other embodiments, the length may be greater than 8 meters or less than 3 meters. In certain embodiments, each group A or B may have a length of 16 feet (5 meters). Although 2 groups are illustrated, certain embodiments may include 3 or more groups configured similarly to the depicted embodiment. Additional groups of the geophysical sensors 30 may be positioned in other portions or segments of the streamers 40. The spacers 50 are depicted as transparent to allow viewing of the geophysical sensors 30 that are disposed within the spacers 50.

The spacers 50 may be of any suitable shape. Non-limiting examples may include a cylinder, disc, sphere, and/or prism, among others. The spacers 50 may be made from a variety of suitable materials. Non-limiting examples may include a polymer such as polyurethane, a foam material, such as foamed polyurethane, aliphatic polyamides, semi-aromatic polyamides, polyoxymethylene, polyether ether ketone, or metal such as aluminum, among others. Some of the spacers 50 may be filled with a buoyant material such as a gel with a specific gravity that is less than water.

The spacers 50 may have a length ranging from 3 inches (8 centimeters ("cm")) to 6 inches (16 cm) and a diameter ranging from 2 inches (5 cm) to 4 inches (10 cm). In other embodiments, the spacers 50 may have a length that may be less than 8 cm or greater than 16 cm, and a diameter that may be less than 5 cm or greater than 10 cm. The spacers 50 may be separated and arranged into groups, such as the groups A and B, for example. In some embodiments, the groups A and B may each contain a number of spacers 50 such as, for example, 3 to 16 spacers 50. In other embodiments, the groups A and B may include more than 16 spacers 50 or less than 3 spacers 50. Spacing between the spacers 50 within a group may range from 4 inches (10 cm) to 8 inches (20 cm). In other embodiments, the spacing between the spacers 50 may be greater than 20 cm or less than 10 cm.

In certain embodiments, the streamers 40 may include buoyancy spacers (not shown) that do not contain any geophysical sensor 30 and are only utilized for buoyancy. Suitable buoyancy spacers may be made from a buoyant material, including, for example, a foam material, such as foamed polypropylene. In some embodiments, the number and density of the buoyancy spacers may be selected to provide the streamers 40 with approximately the same overall density as seawater. In other embodiments, the number and density of the buoyancy spacers may be selected to provide the streamers 40 with a density slightly less than freshwater with final adjustments made with addition of ballast.

Communication lines 55 (e.g., telemetry cables such as optical cables, and/or electrical conductors) may be disposed within the streamers 40 and allow communication between the recording system 20 and the geophysical sensors 30. The communication lines 55 may also supply power to the geophysical sensors 30. The communication lines 55 may be coupled to or bundled with the lead-in lines 45. The lead-in lines 45 may extend outward from a rear of the survey vessel 10. In certain embodiments, a spreader 47 may extend across and attach to the lead-in lines 45 to spread the lead-in lines 45 apart and prevent entanglement of the lead-in lines 45. Embodiments may use conventional spreader technology, such as paravanes (not shown), to spread streamers 40 apart.

In some embodiments, each streamer 40 may also include a skin or jacket 60 that encompasses the spacers 50. The jacket 60 is illustrated as transparent to allow viewing of internal components of each streamer 40. The jacket 60 may be a sealed enclosure that prevents external substances (e.g., sea water) from entering the streamers 40 and contacting internal components (e.g., the spacers 50) of the streamers 40. The jacket 60 may be made from a flexible and acoustically transparent plastic such as polyurethane. The jacket 60 allows seismic energy to pass essentially unimpeded through the jacket 60 to the geophysical sensors 30 that are disposed inside the jacket 60. In general, the spacers 50 may be arranged in each of the jackets 60 at spaced apart locations in an axial direction along the longitudinal axis L (e.g., shown on FIG. 2). The spacers 50 may typically be arranged in the jackets 60, for example, to provide structural support for the streamers 40 as well as house the geophysical sensors 30.

In particular embodiments, the spacers 50 of each group (e.g., group A or B) may be attached to separate alignment preservers (e.g., alignment preservers 75, 100, and 105, shown on FIGS. 2-4) which may urge matching rotational orientations of the geophysical sensors 30 of a particular group during any twisting of the streamers 40 as the streamers 40 are towed through the body of water 15.

Each streamer 40 may include a section break 65 that may be positioned between sensor groups such as the groups A and B. The section break 65 may be a region of each streamer 40 where the spacers 50 of the group A are not attached to the spacers 50 of the group B with the alignment preservers 75, 100, or 105 as shown on FIGS. 2-4, for example. The section break 65 allows twisting of the streamer 40 within the section break 65, if needed, rather than breakage of an alignment preserver of group A and/or B due to over twisting (i.e., twisting of the spacers 50 of either or both groups A or B beyond an upper limit of tension that the alignment preserver(s) can withstand).

The length of the section-break 65 may range from 13 feet (4 meters) to 33 feet (10 meters). In other embodiments, the section-break 65 may be longer than 10 meters or shorter than 4 meters. In particular embodiments, the length of the section-break 65 may be 26 feet (8 meters). Although only one section-break 65 is shown, more than one section-break 65 may be included in each streamer 40, depending on the number of groups (e.g., groups A and B). For example, a streamer 40 with three groups A, B, and C (not shown) may include two section breaks 65 (a section break 65 positioned between the groups A and B, and a second section break 65 positioned between groups B and C).

Figure 2:
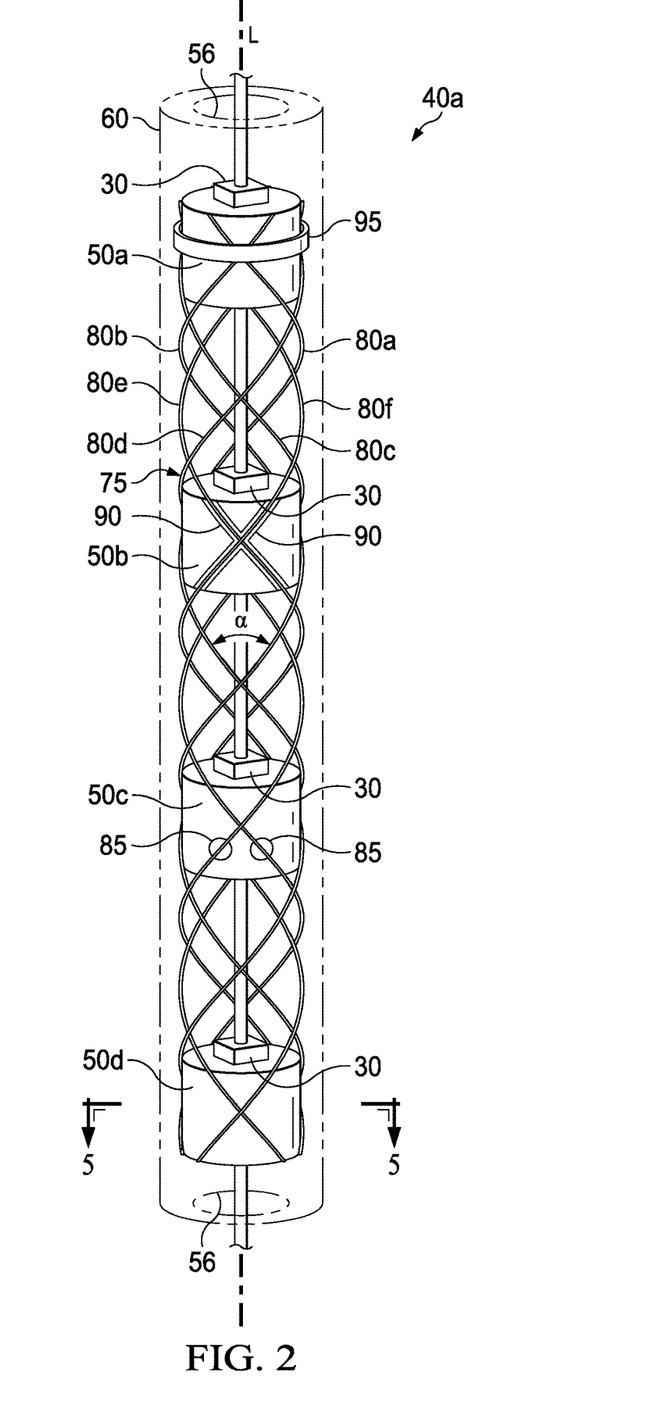
FIG. 2 illustrates an exemplary alignment preserver disposed within a marine geophysical streamer.

FIG. 2 illustrates the alignment preserver 75 aligning geophysical sensors 30 of the group A or B (e.g., shown on FIG. 1) disposed within the jacket 60 of a streamer 40a in accordance with particular embodiments of the present disclosure. The streamer 40a may be similar to the streamers 40 of FIG. 1. The spacers 50a-50d may contain the geophysical sensors 30 and may be similar to the spacers 50 (shown on FIG. 1). Each of the groups A and B may include a separate alignment preserver 75.

The alignment preserver 75 may be disposed within the jacket 60 (e.g., also shown on FIG. 1) of each streamer 40 (e.g., also shown on FIG. 1). The alignment preserver 75 may include flexible lines or strands 80a-80f that contact and surround the spacers 50a-50d to secure the spacers 50a-50d. Although flexible, the strands 80a-80f do not stretch to urge matching rotational orientations among all the geophysical sensors 30 within the group A or B during streamer twist that may occur while the streamers 40 (e.g., shown on FIG. 1) are being towed.

Each of the strands 80a-80f may range in length from 10 feet (3 meters) to 33 feet (10 meters). In other embodiments, the length of the strands 80a-80f may be greater than 10 meters or less than 3 meters. A thickness of the strands 80a-80f may range from 0.5 millimeters ("mm") to 3 mm. In other embodiments, the thickness of the strands 80a-80f may be greater than 3 mm or less than 0.5 mm, for example. The strands 80a-80f may be made of any suitable material such as, but not limited to, polymers, aramids, ultra-high-molecular-weight polyethylene, liquid-crystal polymers, poly-paraphenylene terephthalamide, or combinations thereof. The spacers 50a-50d may be coupled to each other with the alignment preserver 75. The spacers 50a-50d and the alignment preserver 75 are free to twist in unison within the jacket 60 of the streamer 40.

Although illustrated with six strands, other embodiments may include at least two strands or more than six strands. The strands 80b, 80d, and 80f may extend along at least a portion of each of the spacers 50a-50d and wrap around or encompass at least a portion of each of the spacers 50a-50d in a clockwise or counterclockwise direction. In particular embodiments, the strands 80b, 80d, and 80f may be configured as a spiral. The strands 80a, 80c, and 80e may extend along at least a portion of each of the spacers 50a-50d and wrap around or encompass at least a portion of each of the spacers 50a-50d in a counterclockwise or clockwise direction. In particular embodiments, the strands 80a, 80c, and 80e may be configured as a spiral. The strands 80a-80f may intersect with one another to form a network of intersecting strands (e.g., a net) that secure the spacers 50a-50d, as shown. In certain embodiments, the geophysical sensors 30 may protrude from within the spacers 50a-50d. The geophysical sensors 30 may be coupled to communication lines 55 (e.g., shown on FIG. 1). A communication line 55 is not shown to allow viewing of a mesh configuration of the strands 80a-80f.

The jacket 60 of the streamer 40 may include openings 56 to allow passage of a communication line 55 through the spacers 50a-50d to the sensors 30. The alignment preserver 75 may be wrapped around the spacers 50a-50d to allow passage of the communication line 55 through a center of the alignment preserver 75 along the longitudinal axis L of the spacers 50 (and the streamer 40). It should be noted that the openings 56 are not drawn to scale and are shown for illustrative purposes. For example, in some embodiments, the openings 56 may tightly engage the communication line 55 as to provide a seal to prevent unwanted material (e.g., seawater) from entering the streamer 40.

In particular embodiments, the strands 80a-80f may be attached to the spacers 50a-50d with an adhesive (e.g., an adhesive 85 disposed on the spacer 50c). Although only the spacer 50c is shown with the adhesive 85, each of the spacers 50a-50d may be attached to the strands 80a-80f with the adhesive 85.

In some embodiments, the strands 80a-80f may be secured within grooves of the spacers 50a-50d (e.g., grooves 90 of the spacer 50b). Although only the spacer 50b is shown with the grooves 90, each of the spacers 50a-50d may include one or more of the grooves 90 for securing the strands 80a-80f.

In other embodiments, a mechanical fastener such as a clamp or band (e.g., a band 95 on the spacer 50a) may extend circumferentially around at least a portion of each of the spacers 50a-50d to secure the strands 80a-80f against the spacers 50a-50d. The mechanical fasteners may be disposed between the jacket 60 and the alignment preserver 75. The band 95 may be swaged or press-fitted onto the spacers 50a-50d, for example. Although only the spacer 50a is shown with the band 95, each of the spacers 50a-50d may include the band 95 to secure the strands 80a-80f. Combinations of the above-mentioned attachment mechanisms may also be utilized in certain embodiments.

Angles of attachment for all of the strands 80a-80f against their respective spacers 50a-50d may range from 30° (e.g., angle $\alpha$ on the spacer 50b) through 135° relative to the longitudinal axis L of the streamer 40 (and the spacers 50a-50d). In other embodiments, the angles of attachment may be less than 30° or greater than 135°, relative to the longitudinal axis L of the streamer 40.

The tension in the strands 80a-80f may range from 2,000 Newtons to 30,000 Newtons or more during towing of the streamers 40 (e.g., shown on FIG. 1). In other embodiments, the tension in the strands 80a-80f may be less than 2,000 Newtons during towing of the streamers 40. The tension may urge alignment of the spacers 50a-50d and may urge matching rotational orientations of the geophysical sensors 30 disposed within the spacers 50a-50d during twisting of any of the spacers 50a-50d. For example, the spacer 50a may twist a number of degrees (e.g., 5°) and the alignment preserver 75 may urge the spacers 50b-50d to also twist the same number of degrees (e.g., 5°) to maintain the same rotational orientation for all of the geophysical sensors 30 within the group A or B (e.g., shown on FIG. 1). That is, when the spacer 50a twists 5°, the strands 80a-80f may pull the spacers 50b-50d to twist the spacer 50b-50d also 5° due to the attachment angles $\alpha$ and/or the tension in the strands 80a-80f, thereby urging alignment of the spacers 50a-50d within the group A or B (e.g., shown on FIG. 1) and urging matching rotational orientations for all of the geophysical sensors 30 within the respective group. It should be noted that a degree of twist of 5° is strictly exemplary. The degree of twist may be greater than 5° or less than 5°.

Figure 3:
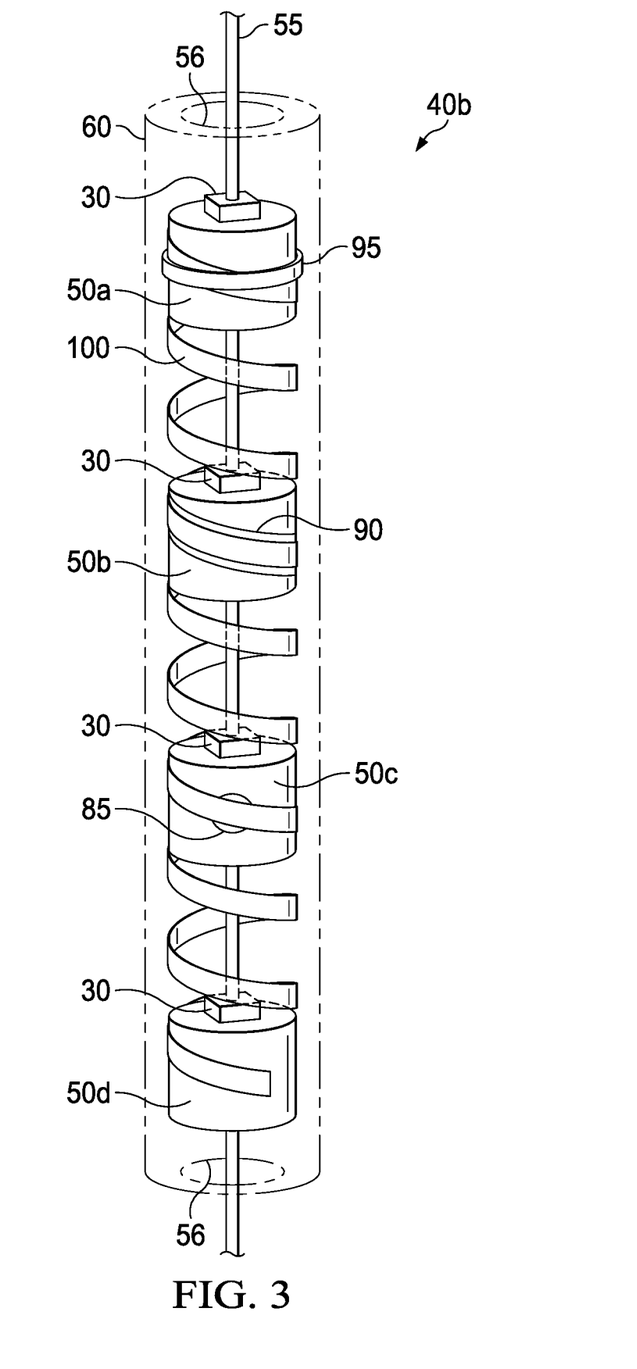
FIG. 3 illustrates another exemplary alignment preserver disposed within a marine geophysical streamer.

FIG. 3 illustrates an alignment preserver 100 aligning the spacers 50a-50d of the group A or B (e.g., shown on FIG. 1) disposed within the jacket 60 of the streamer 40b in accordance with particular embodiments of the present disclosure. The streamer 40b may be similar to the streamers 40 of FIG. 1. Each of the groups A and B may include a separate alignment preserver 100. The alignment preserver 100 may be disposed within the jacket 60 (e.g., also shown on FIG. 1) of each streamer 40 (e.g., also shown on FIG. 1). The alignment preserver 100 may be a flexible member that contacts and surrounds the spacers 50a-50d to secure the spacers 50a-50d. Although flexible, the alignment preserver 100 does not stretch in order to urge matching rotational orientations among all the geophysical sensors 30 within the group A or B during streamer twist that may occur while the streamers 40 (e.g., shown on FIG. 1) are being towed. The alignment preserver 100 may extend along at least a portion of each of the spacers 50a-50d and wrap around or encompass at least a portion of each of the spacers 50a-50d in a clockwise or counterclockwise direction such as a spiral direction, for example. The alignment preserver 100 may have a length ranging from 10 feet (3 meters) to 33 feet (10 meters). In some embodiments, the length of the alignment preserver 100 may range from 33 feet (10 meters) to 328 feet (100 meters). In other embodiments, the alignment preserver 100 may have a length that may be less than 3 meters or greater than 100 meters. A thickness of the alignment preserver 100 may range from 1 mm to 3 mm. In some embodiments, the thickness of the alignment preserver 100 may range from 3 mm to 10 mm, for example. In other embodiments, the thickness may be less than 3 mm or greater than 10 mm. A width of the alignment preserver 100 may range from 3 mm to 100 mm. Alternatively, the width may range from 3 mm to 10 mm, or 100 mm to 500 mm, for example. In other embodiments, the width may be less than 3 mm, 10 mm to 100 mm, or greater than 500 mm.

The spacers 50a-50d may be coupled to each other with the alignment preserver 100. The spacers 50a-50d and the alignment preserver 100 are free to rotate in unison within the jacket 60 of the streamer 40. The alignment preserver 100 may be made of any suitable material such as carbon fiber, plastic, rubber, or combinations thereof, for example. In certain embodiments, the geophysical sensors 30 may protrude from within the spacers 50a-50d. The geophysical sensors 30 may be coupled to the communication lines 55 (e.g., shown on FIG. 1). A communication line 55 may pass through the openings 56 at the ends of the streamer 40.

In particular embodiments, the alignment preserver 100 may be attached to the spacers 50a-50d with the adhesive 85 (e.g., see the spacer 50c). Although only the spacer 50c is shown with the adhesive 85, each of the spacers 50a-50d may be attached to the alignment preserver 100 with the adhesive 85.

In some embodiments, the alignment preserver 100 may be secured within a groove of the spacers 50a-50d (e.g., the groove 90 of the spacer 50b). Although only the spacer 50b is shown with the groove 90, each of the spacers 50a-50d may include one or more of the grooves 90 for securing the alignment preserver 100.

In other embodiments, a mechanical fastener such as a clamp or band (e.g., the band 95 on the spacer 50a) may extend circumferentially around at least a portion of each of the spacers 50a-50d to secure the alignment preserver 100 against the spacers 50a-50d. The mechanical fasteners may be disposed between the jacket 60 and the alignment preserver 100. The band 95 may be swaged or press-fitted onto the spacers 50a-50d, for example. Although only the spacer 50a is shown with the band 95, each of the spacers 50a-50d may include the band 95 to secure the alignment preserver 100. Combinations of the above-mentioned attachment mechanisms may also be utilized in certain embodiments.

Angles of attachment for the alignment preserver 100 against the spacers 50a-50d may range from 30° through 135° relative to a longitudinal axis L of the streamer 40 (e.g., the angle α shown on FIG. 2). In other embodiments, the angles of attachment may be less than 30° or greater than 135°, relative to the longitudinal axis L of the streamer 40.

The tension in the alignment preserver 100 may range from 2,000 Newtons to 30,000 Newtons or more during towing of the streamers 40 (e.g., shown on FIG. 1). In other embodiments, the tension in the alignment preserver 100 may be less than 2,000 Newtons during towing of the streamers 40. The tension may urge alignment of the spacers 50a-50d and urge matching rotational orientations of the geophysical sensors 30 disposed within the spacers 50a-50d during twisting of any of the spacers 50a-50d. For example, the spacer 50a may twist 5° and the alignment preserver 75 may urge the spacers 50b-50d to also twist 5° to maintain the same rotational orientation for all of geophysical sensors 30 within the group A or B (e.g., shown on FIG. 1). That is, when the spacer 50a twists 5°, the alignment preserver 100 pulls the spacers 50b-50d to twist the spacer 50b-50d also 5° due to the attachment angles α (e.g., shown on FIG. 2) and/or the tension in the alignment preserver 100, thereby urging alignment of the spacers 50a-50d within the group A or B (e.g., shown on FIG. 1) and urging matching rotational orientations for all of the geophysical sensors 30 within the respective group. It should be noted that a degree of twist of 5° is strictly exemplary. The degree of twist may be greater than 5° or less than 5° in some embodiments.

Figure 4:
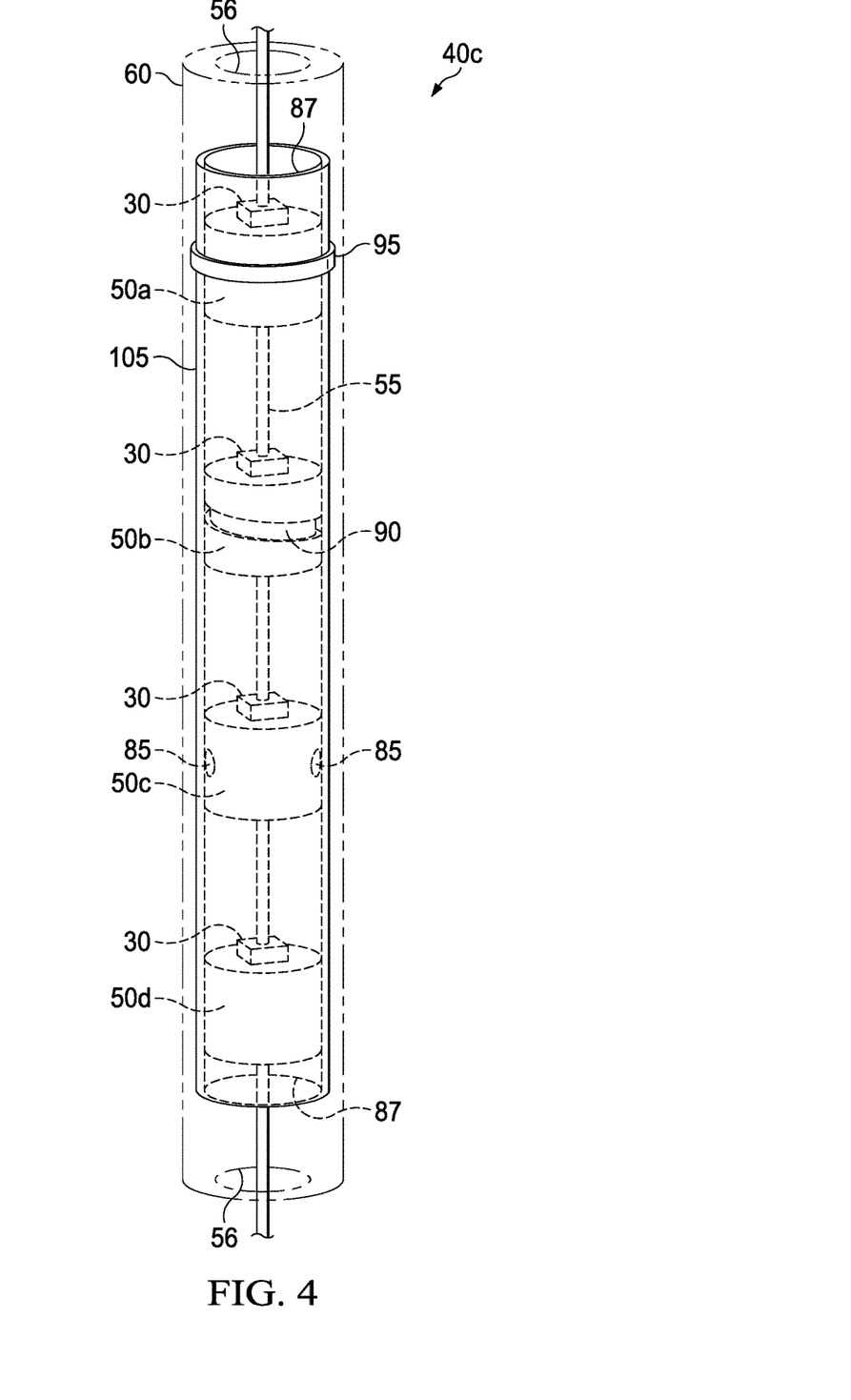
FIG. 4 illustrates another exemplary alignment preserver disposed within a marine geophysical streamer.

FIG. 4 illustrates an alignment preserver 105 aligning the spacers 50a-50d of the group A or B (e.g., shown on FIG. 1) disposed within the jacket 60 of the streamer 40c in accordance with particular embodiments of the present disclosure. The streamer 40c may be similar to the streamers 40 of FIG. 1. Each of the groups A and B may include a separate alignment preserver 105. The alignment preserver 105 may be disposed within the jacket 60 (e.g., also shown on FIG. 1) of each streamer 40 (e.g., also shown on FIG. 1). The alignment preserver 105 may be a flexible tubular member such as a liner or sleeve made of fabric that contacts and surrounds at least a portion of each of the spacers 50a-50d to secure the spacers 50a-50d. The fabric may include, but is not limited to, any suitable material such as carbon fiber, polymers, aramids, ultra-high-molecular-weight polyethylene, liquid-crystal polymers, and/or poly-paraphenylene terephthalamide. Although flexible, the alignment preserver 105 does not stretch in order to urge matching rotational orientations among all the geophysical sensors 30 within the group A or B during streamer twist that may occur while the streamers 40 (e.g., shown on FIG. 1) are being towed. The alignment preserver 105 may extend along at least a portion or length of each of the spacers 50a-50d and wrap around or encompass at least a portion of each of the spacers 50a-50d. The alignment preserver 105 may have a length ranging from 10 feet (3 meters) to 33 feet (10 meters). In some embodiments, the length may range from 33 feet (10 meters) to 328 feet (100 meters). In other embodiments, the alignment preserver 105 may have a length that may be less than 3 meters or greater than 100 meters. The alignment preserver 105 is illustrated as transparent to allow viewing of internal components (e.g., the spacers 50a-50d).

The spacers 50a-50d may be coupled to each other with the alignment preserver 105. The spacers 50a-50d and the alignment preserver 105 are free to rotate in unison within the jacket 60 of the streamer 40. The alignment preserver 105 may be made of any suitable material, including, but not limited to, carbon fiber, polymers, aramids, ultra-high-molecular-weight polyethylene, liquid-crystal polymers, poly-paraphenylene terephthalamide, or combinations thereof. In certain embodiments, the geophysical sensors 30 may protrude from within the spacers 50a-50d. The geophysical sensors 30 may be coupled to a communication line 55 (e.g., also shown on FIG. 1). The jacket 60 of the streamer 40 may include the openings 56 positioned at ends of the streamer 40 to allow passage of the communication line 55 through the spacers 50a-50d to the sensors 30. The alignment preserver 105 may include openings 87 positioned at ends of the alignment preserver 105 to also allow passage of the communication line 55. It should be noted that the openings 56 and 87 are not drawn to scale and are shown for illustrative purposes. The openings 86 and 87 may tightly engage the communication line 55 as to provide a seal to prevent unwanted material (e.g., seawater) from entering the streamer 40 and/or the alignment preserver 105.

In particular embodiments, the alignment preserver 105 may be attached to the spacers 50a-50d with the adhesive 85 (e.g., see the spacer 50c). Although only the spacer 50c is shown with the adhesive 85, each of the spacers 50a-50d may be attached to the alignment preserver 100 with the adhesive 85.

In some embodiments, the alignment preserver 105 may be secured (e.g., pressed inward) within a groove of the spacers 50a-50d (e.g., the groove 90 of the spacer 50b). Although only the spacer 50b is shown with the groove 90, each of the spacers 50a-50d may include one or more of the grooves 90 for securing the alignment preserver 100.

In other embodiments, a mechanical fastener such as a clamp or band (e.g., the band 95 on the spacer 50a) may extend circumferentially around at least a portion of each of the spacers 50a-50d to secure the alignment preserver 105 against the spacers 50a-50d. The mechanical fasteners may be disposed between the jacket 60 and the alignment preserver 105. The band 95 may be swaged or press-fitted onto the spacers 50a-50d, for example. Although only the spacer 50a is shown with the band 95, each of the spacers 50a-50d may include the band 95 to secure the alignment preserver 105. Combinations of the above-mentioned attachment mechanisms may also be utilized in certain embodiments.

The tension in the alignment preserver 105 may range from 2,000 Newtons to 30,000 Newtons or more during towing of the streamers 40 (e.g., shown on FIG. 1). In other embodiments, the tension in the alignment preserver 100 may be less than 2,000 Newtons during towing of the streamers 40. The tension may urge alignment of the spacers 50a-50d and urge matching rotational orientations of the geophysical sensors 30 disposed within the spacers 50a-50d during twisting of any of the spacers 50a-50d. For example, the spacer 50a may twist 5° and the alignment preserver 75 urges the spacers 50b-50d to also twist 5° to maintain the same rotational orientation for all of the geophysical sensors 30 within the group A or B (e.g., shown on FIG. 1). That is, when the spacer 50a twists 5°, the alignment preserver 100 pulls the spacers 50b-50d to twist the spacer 50b-50d also 5° due to the tension in the alignment preserver 105, thereby urging alignment of the spacers 50a-50d within the group A or B (e.g., shown on FIG. 1) and urging matching rotational orientations for all of the geophysical sensors 30 within the respective group. In certain embodiments, combinations of the alignment preservers 75, 100, and/or 105 may be utilized for each of the streamers 40 (e.g., shown on FIG. 1). It should be noted that a degree of twist of 5° is strictly exemplary. The degree of twist may be greater than 5° or less than 5° in some embodiments.

Figure 5:
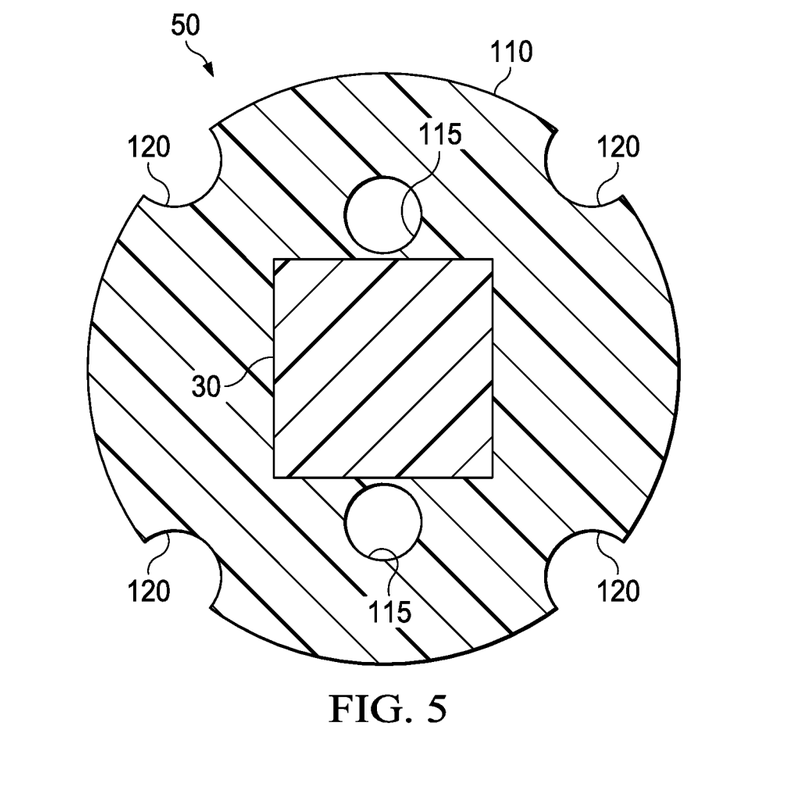
FIG. 5 illustrates a cross-sectional view of an exemplary spacer that may be contained within a marine geophysical streamer.

FIG. 5 illustrates a cross-sectional view of a spacer 50 (e.g., the spacer 50d of FIG. 2) in accordance with particular embodiments of the present disclosure. It should be noted that all of the spacers described in the disclosure may be configured similarly. As illustrated, the spacer 50 may include a housing 110 with a geophysical sensor 30 mounted therein. The spacer 50 may include one or more through passages 115. The through passages 115 may provide ingress and egress for internal streamer components such as the communication lines 55 (e.g., shown on FIG. 1). Other internal streamer components that may pass through the through passages 115 may include strength members, for example.

In at least one embodiment, the housing 110 may include one or more indentations 120. The one of more indentations 120 may engage and secure the twist arrestors (e.g., the twist arrestors 75, 100, and/or 105 shown on FIGS. 2-4). The indentations 120 may be similar to the grooves 90 (e.g., shown on FIGS. 2-4) in that they are both utilized to secure the twist arrestors against the spacers.

Figure 6:
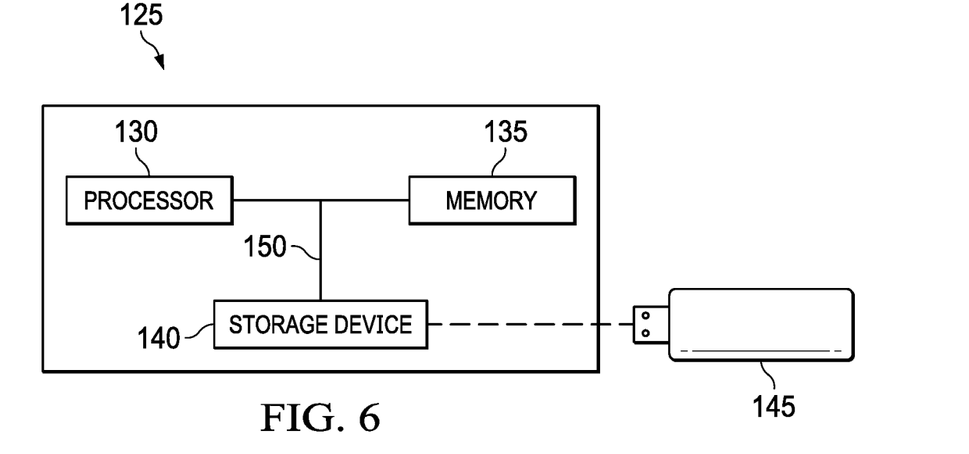
FIG. 6 illustrates an exemplary computer system utilized to process and/or store data acquired with geophysical sensors contained in a marine geophysical streamer.

FIG. 6 illustrates a computer system 125 that may be utilized to process and/or store data acquired with the geophysical sensors 30 (e.g., shown on FIG. 1) in accordance with particular embodiments of the present disclosure. The computer system 125 is an example of a computer system that may be utilized to operate the geophysical sensors 30 and create a geophysical data product. The example computer system 125 comprises a processor 130 coupled to a memory 135 and a storage system or storage device 140. The processor 130 may be any currently available processor, or group of processors. The memory 135 may be random access memory (RAM) which forms the working memory for the processor 130. In some embodiments, data and programs may be copied from the storage device 140 to the memory 135 as part of the operation of the computer system 125.

The storage device 140 may be a device or devices that implement non-volatile long-term storage, which may also be referred to as a non-transitory computer-readable media. In some embodiments, the storage device 140 may be a hard drive or solid-state drive, but other examples include flash memory devices 145, for example. The various programs used to implement the programmatic aspects may thus be stored on the storage device 140 and executed by the processor 130. Survey data may be communicated to the storage device 140 (including the flash memory device 145) with the processor 130 by way of a telemetry channel 150 to become a geophysical data product.

In accordance with an embodiment, the geophysical data product may be indicative of certain properties of the subsurface rock that may be produced from the detected energy. The geophysical data product may include processed seismic or electromagnetic geophysical data. The geophysical data product may be produced offshore (i.e., by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

With reference to FIGS. 1-6, operation of the alignment preservers 75, 100, and/or 105 are described as follows. The survey vessel 10 may deploy the streamers 40 including the spacers 50 (e.g., shown on FIGS. 1-5) into the body of water 15 (e.g., shown on FIG. 1). As the survey vessel 10 tows the streamers 40 in the body of water 15, the streamers 40 may twist. As the streamers 40 twist, the alignment preservers 75, 100, 105 (e.g., shown on FIGS. 2-4) urge alignment of the spacers 50a-50d and urge matching rotational orientations among all the geophysical sensors 30 within a group of geophysical sensors 30 (e.g., group A and/or group B, shown on FIG. 1), thereby allowing acquisition of accurate geophysical data (e.g., see FIG. 6) from the geophysical sensors 30.

If there is a conflict in the usages of a word or term in this specification and or more patent or other documents that may be incorporated herein by reference, the definitions that are consistent with this specification should be adopted for the purposes of understanding this disclosure.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A marine geophysical streamer comprising:
   a jacket;
   spacers disposed longitudinally within the jacket, the spacers containing geophysical sensors; and
   an alignment preserver disposed within the jacket, the alignment preserver encompassing at least a portion of each of the spacers and configured to urge matching rotational orientations for the geophysical sensors, wherein the alignment preserver comprises flexible strands extending longitudinally within the jacket while also wrapping around at least a portion of each of the spacers in clockwise and counterclockwise directions to form a network of intersecting strands, wherein the flexible strands do not stretch.

2. The marine geophysical streamer of claim 1, wherein the flexible strands comprise at least one material selected from the group consisting of a polymer, an aramid, ultra-high-molecular-weight polyethylene, a liquid-crystal polymer, poly-paraphenylene terephthalamide, and combinations thereof.

3. The marine geophysical streamer of claim 1, wherein the alignment preserver is secured within grooves of the spacers.

4. The marine geophysical streamer of claim 1, further comprising a second alignment preserver, wherein the spacers are divided into a first and a second group, wherein at least a portion of each of the spacers in the first group is encompassed by the alignment preserver, wherein at least a portion of each spacer in the second group is encompassed by the second alignment preserver, wherein the alignment preserver is not attached to the second alignment preserver.

5. A marine geophysical streamer comprising:
a jacket;
spacers disposed longitudinally within the jacket, the spacers containing geophysical sensors; and
an alignment preserver disposed within the jacket, the alignment preserver encompassing at least a portion of each of the spacers and configured to urge matching rotational orientations for the geophysical sensors, and
wherein the alignment preserver is secured with bands that circumferentially extend around at least a portion of each of the spacers.

6. The marine geophysical streamer of claim 5, wherein the alignment preserver comprises flexible strands extending longitudinally within the jacket.

7. The marine geophysical streamer of claim 6, wherein the flexible strands are also wrapped around at least a portion of each of the spacers.

8. The marine geophysical streamer of claim 7, wherein the flexible strands are wrapped in clockwise and counterclockwise directions.

9. The marine geophysical streamer of claim 8, wherein the flexible strands are arranged to form a network of intersecting strands.

10. The marine geophysical streamer of claim 9, wherein the flexible strands do not stretch.

11. The marine geophysical streamer of claim 10, wherein the flexible strands comprise at least one material selected from the group consisting of a polymer, an aramid, ultra-high-molecular-weight polyethylene, a liquid-crystal polymer, poly-paraphenylene terephthalamide, and combinations thereof.

12. A marine geophysical streamer comprising:
a jacket;
spacers disposed longitudinally within the jacket, the spacers containing geophysical sensors; and
an alignment preserver disposed within the jacket, the alignment preserver encompassing at least a portion of each of the spacers and configured to urge matching rotational orientations for the geophysical sensors, and
wherein the alignment preserver is attached with adhesive to the spacers.

13. The marine geophysical streamer of claim 12, wherein the alignment preserver comprises flexible strands extending longitudinally within the jacket.

14. The marine geophysical streamer of claim 13, wherein the flexible strands are also wrapped around at least a portion of each of the spacers.

15. The marine geophysical streamer of claim 14, wherein the flexible strands are wrapped in clockwise and counterclockwise directions.

16. The marine geophysical streamer of claim 15, wherein the flexible strands are wrapped in clockwise and counterclockwise directions to form a network of intersecting strands.

17. The marine geophysical streamer of claim 16, wherein the flexible strands do not stretch.

18. The marine geophysical streamer of claim 17, wherein the flexible strands comprise at least one material selected from the group consisting of a polymer, an aramid, ultra-high-molecular-weight polyethylene, a liquid-crystal polymer, poly-paraphenylene terephthalamide, and combinations thereof.

19. A method comprising:
towing a streamer in a body of water with a survey vessel, the streamer comprising a first group of spacers comprising geophysical sensors;
urging matching rotational orientations of the geophysical sensors in the first group of spacers with a first alignment preserver that encompasses at least a portion of each of the spacers in the first group of spacers;
urging matching rotational orientations of geophysical sensors that are disposed in a second group of spacers, the second group of spacers disposed within the streamer with a second alignment preserver that encompasses at least a portion of each of the spacers in the second group, wherein a section break is positioned between the first and second groups of spacers, wherein the section break is a region of the streamer where the first alignment preserver is not attached to the second alignment preserver; and
wherein the urging matching rotational orientations of the geophysical sensors in the first and second groups comprises urging a same amount of twist for each spacer of each group with flexible strands of the first and second alignment preservers, the flexible strands extending lengthwise within the streamer and wrapping around at least a portion of each of the spacers in clockwise and counterclockwise directions to form a network of intersecting strands, wherein the flexible strands do not stretch.

20. The method of claim 19, further comprising preventing over twisting of at least one of the alignment preservers with the section break.

21. The method of claim 19, further comprising:
detecting energy using one or more of the geophysical sensors; and
producing a geophysical data product from the detected energy indicative of certain properties of subsurface rock below the body of water.

22. A marine geophysical surveying system comprising:
a survey vessel; and
streamers towed behind the surveying vessel, each streamer comprising:
a jacket;
a first and a second group of spacers disposed longitudinally within the jacket, the spacers containing geophysical sensors;
a first alignment preserver disposed within the jacket, the first alignment preserver encompassing at least a portion of each spacer in the first group of spacers and configured to urge matching rotational orientations for the geophysical sensors within the first group;

a second alignment preserver disposed within the jacket, the second alignment preserver encompassing at least a portion of each of the spacers in the second group of spacers and configured to urge matching rotational orientations for the geophysical sensors within the second group, wherein the first alignment preserver is not attached to the second alignment preserver; and wherein the first and second alignment preservers comprise flexible strands extending longitudinally within the jacket while also wrapping around at least a portion of each of the spacers in clockwise and counterclockwise directions to form a network of intersecting strands that encompass and secure the spacers of the first and second groups, wherein the flexible strands do not stretch.

* * * * *